(12) United States Patent
Kim

(10) Patent No.: US 11,513,722 B2
(45) Date of Patent: Nov. 29, 2022

(54) MEMORY SYSTEM ALLOWING OPERATION DURING SUSPENSIONS

(71) Applicant: SK hynix Inc., Gyeonggi-do (KR)

(72) Inventor: Su Kyung Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 6 days.

(21) Appl. No.: 16/918,469

(22) Filed: Jul. 1, 2020

(65) Prior Publication Data

US 2021/0263670 A1 Aug. 26, 2021

(30) Foreign Application Priority Data

Feb. 20, 2020 (KR) .................. 10-2020-0020867

(51) Int. Cl.
*G06F 3/06* (2006.01)

(52) U.S. Cl.
CPC .......... G06F 3/0653 (2013.01); G06F 3/064 (2013.01); G06F 3/0619 (2013.01); G06F 3/0629 (2013.01); G06F 3/0658 (2013.01); G06F 3/0659 (2013.01); G06F 3/0679 (2013.01)

(58) Field of Classification Search
CPC ...... G06F 3/0653; G06F 3/0619; G06F 3/064; G06F 3/0658; G06F 3/0659; G06F 3/0679
See application file for complete search history.

(56) References Cited

U.S. PATENT DOCUMENTS

| | | | | |
|---|---|---|---|---|
| 2011/0302361 A1* | 12/2011 | Yamazaki | ............ | G11C 16/349 711/103 |
| 2017/0285969 A1* | 10/2017 | Madraswala | ........ | G11C 16/225 |
| 2018/0032264 A1* | 2/2018 | Gomez | ................ | G06F 3/0683 |
| 2018/0166130 A1* | 6/2018 | Intrater | ................ | G11C 11/419 |
| 2019/0087128 A1* | 3/2019 | Shin | .................... | G06F 12/0246 |
| 2019/0243577 A1* | 8/2019 | Pelster | ................ | G06F 3/0679 |
| 2020/0081806 A1* | 3/2020 | Brown | .................... | G06F 3/067 |
| 2020/0135283 A1* | 4/2020 | Park | ...................... | G06F 3/0679 |
| 2020/0257552 A1* | 8/2020 | Park | ...................... | G06F 3/0673 |
| 2020/0303012 A1* | 9/2020 | Nishikawa | ............ | G11C 16/32 |
| 2021/0042053 A1* | 2/2021 | Zhang | .................... | G06F 3/064 |
| 2021/0109673 A1* | 4/2021 | Kim | ...................... | G06F 3/0611 |
| 2021/0157511 A1* | 5/2021 | Jo | ........................ | G06F 3/0611 |
| 2021/0202007 A1* | 7/2021 | Sugahara | .......... | G11C 16/3445 |

FOREIGN PATENT DOCUMENTS

KR 10-2018-0009463 1/2018

OTHER PUBLICATIONS

Hsieh et al., Efficient Identification of Hot Data for Flash Memory Storage Systems, ACM Transactions on Storage, Feb. 2006, pp. 22-40, vol. 2, No. 1, ACM, New York, USA.

* cited by examiner

*Primary Examiner* — Andrew J Cheong
(74) *Attorney, Agent, or Firm* — IP & T Group LLP

(57) ABSTRACT

A memory system includes a non-volatile memory device and a controller. The non-volatile memory device performs operations in parallel on a plurality of memory blocks. The controller determines, in response to a read request on a plane including a target memory block among the plurality of memory blocks, whether to perform a process for a partial suspension on the operations based on suspension counts of the plurality of memory blocks. The controller controls, when performing a process for the partial suspension, the non-volatile memory device to suspend the operation being performed on the target memory block and to keep performing the operations being performed on other memory blocks among the plurality of memory blocks.

19 Claims, 10 Drawing Sheets

FIG.2
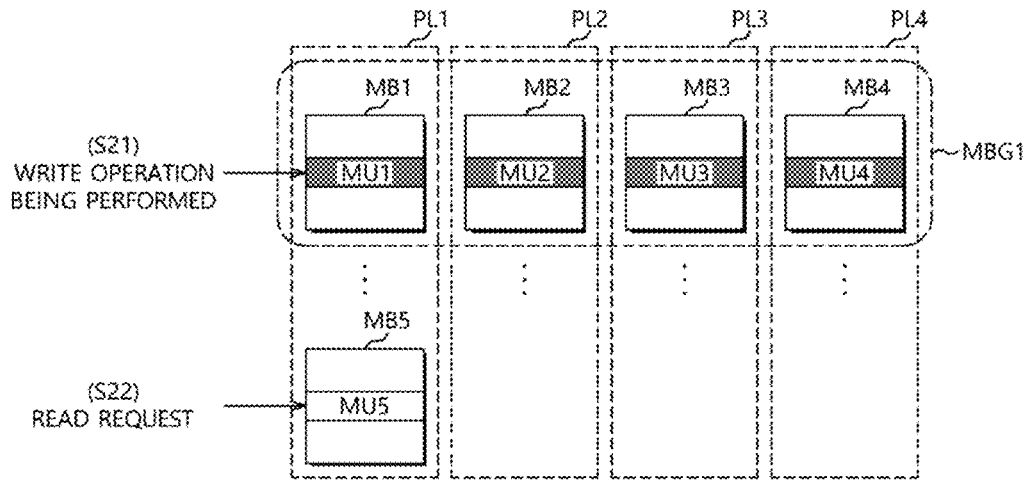
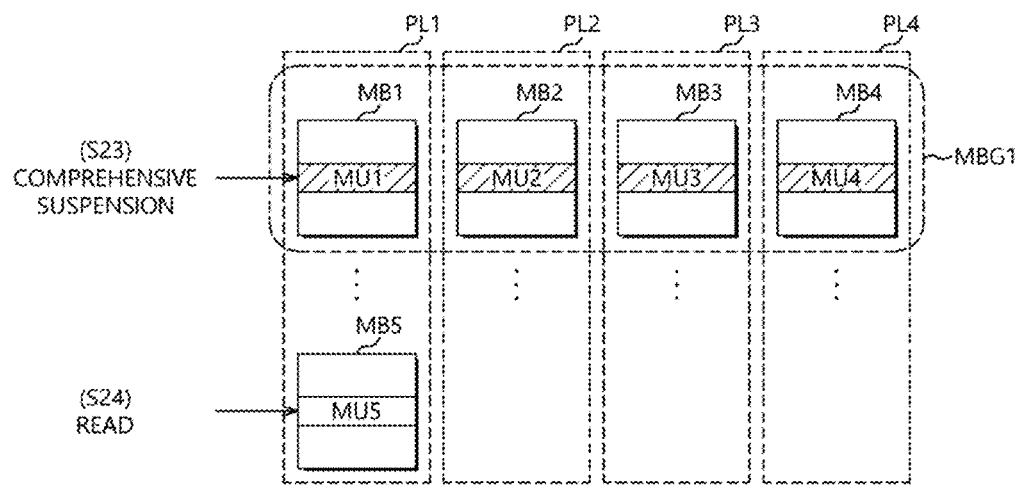
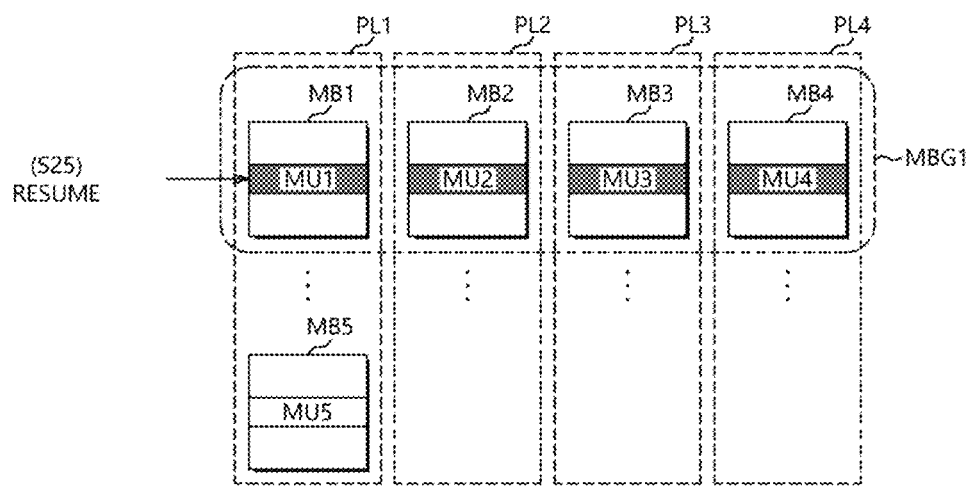

| | SCNT | SOPCNT |
|---|---|---|
| MB1 | 10 | 2 |
| ⋮ | ⋮ | ⋮ |
| MBn | 15 | 4 |

MEMORY SYSTEM ALLOWING OPERATION DURING SUSPENSIONS

CROSS-REFERENCE TO RELATED APPLICATION

The present application claims priority under 35 U.S.C. § 119(a) to Korean application number 10-2020-0020867, filed on Feb. 20, 2020, in the Korean Intellectual Property Office, which is incorporated herein by reference in its entirety as set forth in full.

BACKGROUND

1. Technical Field

Various embodiments generally relate to a memory system, and more particularly, to a memory system including a nonvolatile memory device.

2. Related Art

A memory system may store, in response to a write request from a host device, data provided from the host device. Also, the memory system may provide, in response to a read request from the host device, data stored therein to the host device. The host device may be an electronic device capable of processing data and may include a computer, a digital camera, a mobile phone and so forth. The memory system may be provided within the host device or may be a separate device that is operable when coupled to the host device.

SUMMARY

Various embodiments of the present disclosure provide a memory system capable of effectively managing wear of a non-volatile memory device and improving read performance thereof.

In accordance with an embodiment, a memory system may include a non-volatile memory device and a controller. The non-volatile memory device may perform operations in parallel on a plurality of memory blocks. The controller may determine, in response to a read request on a plane including a target memory block among the plurality of memory blocks, whether to perform a partial suspension process on the operations based on suspension counts of the plurality of memory blocks, respectively, and control, when performing the partial suspension process, the non-volatile memory device to suspend the operation being performed on the target memory block and to keep performing the operations on other memory blocks among the plurality of memory blocks.

In accordance with an embodiment, a memory system may include a non-volatile memory device and a controller. The non-volatile memory device may perform operations in parallel on a plurality of memory blocks. The controller may perform a comprehensive suspension process or a partial suspension process on the operations based on suspension counts of the plurality of memory blocks, respectively.

In accordance with an embodiment, a memory system may include a non-volatile memory device and a controller. The non-volatile memory device may perform first operations in parallel on a plurality of memory blocks included in a plurality of planes. The controller may control the non-volatile memory device to suspend the first operation being performed on a target memory block among the plurality of memory blocks, and perform a second operation on a plane including the target memory block based on an allowed operation count per suspension for the target memory block. The allowed operation count per a suspension may be a maximum number of second operations that are allowed to be performed on the plane after the first operation is suspended and before the suspended first operation is resumed.

In accordance with an embodiment, a memory system may include a memory device and a controller. The memory device may include planes each having blocks, a group being configured by blocks each from the planes. The controller may control the memory device to: suspend at least a lower priority operation on a first block within the group according to first values, perform at least a higher priority operation on at least a second block according to a second value, and resume each suspended operation after completion of each higher priority operation. The first and second blocks may belong to the same plane among the planes. The first values may be numbers of times that lower priority operations are suspended on the blocks within the group, respectively. The second value may be a maximum number of times that higher priority operations are allowed to be performed during the suspension.

In accordance with an embodiment, the memory system may effectively manage wear of the non-volatile memory device and improving read performance thereof.

BRIEF DESCRIPTION OF THE DRAWINGS

Features, aspects and embodiments are described in conjunction with the attached drawings, in which:

FIG. 2 is a diagram illustrating a method in which a suspension manager, such as that of FIG. 1, performs a process of comprehensive suspension in accordance with an embodiment;

DETAILED DESCRIPTION

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure is thorough and complete, and fully conveys the scope of the present invention to those skilled in the art. Throughout the specification, reference to "an embodiment," "another embodiment" or the like is not necessarily to only one embodiment, and different references to any such phrase are not necessarily to the same embodiment(s).

The drawings are not necessarily to scale and, in some instances, proportions may have been exaggerated in order to clearly illustrate features of the embodiments. The terminology used herein is for the purpose of describing particular embodiments only and is not intended to be limiting of the invention.

As used herein, the term "and/or" includes at least one of the associated listed items. It will be understood that when an element is referred to as being "connected to", or "coupled to" another element, it may be directly on, connected to, or coupled to the other element, or one or more intervening elements may be present. As used herein, singular forms are intended to include the plural forms and vice versa, unless the context clearly indicates otherwise. It will be further understood that the terms "comprises," "comprising," "includes," and "including" when used in this specification, specify the presence of the stated elements and do not preclude the presence or addition of one or more other elements.

Hereinafter, embodiments of the present disclosure are described below with reference to the accompanying drawings.

Figure 1:
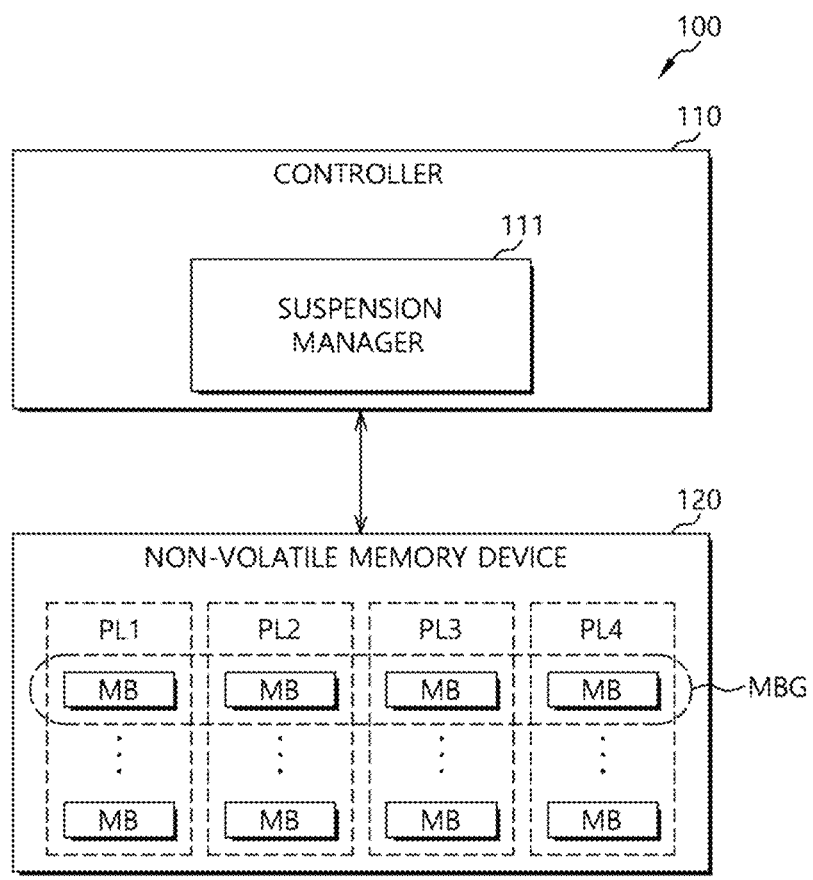
FIG. 1 is a block diagram illustrating a memory system in accordance with an embodiment.

FIG. 1 is a block diagram illustrating a memory system 100 in accordance with an embodiment.

The memory system 100 may be configured to store data provided from an external host device (not illustrated) in response to a write request from the external host device. The memory system 100 may be configured to provide stored data to the external host device in response to a read request from the external host device.

The memory system 100 may be configured as a Personal Computer Memory Card International Association (PCM-CIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), and/or a Solid State Drive (SSD).

The memory system 100 may include a controller 110 and a non-volatile memory device 120.

The controller 110 may control general operation of the memory system 100. The controller 110 may control the non-volatile memory device 120 in order to perform a foreground operation in response to a request from the host device. The foreground operation may include an operation of writing data in the non-volatile memory device 120 and reading data from the non-volatile memory device 120 in response to a request (e.g., a write request and a read request) from the host device.

The controller 110 may control the non-volatile memory device 120 in order to perform a background operation independent of instruction from the host device. The background operation may include a wear leveling operation, a garbage collection operation, an erase operation, a read reclaim operation, a refresh operation and so forth on the non-volatile memory device 120. Like the foreground operation, the background operation may include an operation of writing data in the non-volatile memory device 120 and reading data from the non-volatile memory device 120.

The non-volatile memory device 120 may store therein data transferred from the controller 110 according to the control of the controller 110. The non-volatile memory device 120 may read data therefrom and provide the read data to the controller 110 according to the control of the controller 110.

The nonvolatile memory device may include a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

The non-volatile memory device 120 may include one or more memory chips, one or more memory dies or one or more memory packages.

The non-volatile memory device 120 may include planes PL1 to PL4. Although FIG. 1 illustrates the non-volatile memory device 120 including four planes PL1 to PL4, the present invention is not limited in that respect. The non-volatile memory device 120 may include any suitable number of planes.

Each of the planes PL1 to PL4 may include a plurality of memory blocks MB. A memory block MB may be a unit on which the non-volatile memory device 120 may perform an erase operation.

Although not illustrated, each of the plurality of memory blocks MB may include a plurality of memory units, e.g., pages. A memory unit may be a unit on which the non-volatile memory device 120 may perform a write operation or a read operation.

The non-volatile memory device 120 may perform, in parallel, operations on the plurality of memory blocks MB in a memory block group MBG. The memory block group MBG may comprise the plurality of memory blocks MB from different planes on which the non-volatile memory device 120 performs operations in parallel. The memory block group MBG may be configured over the planes PL1 to PL4. Although FIG. 1 illustrates that the memory block group MBG includes a single memory block MB selected from each of the planes PL1 to PL4, the present invention is not limited to that specific arrangement. The memory block group MBG may include a plurality of memory blocks MB selected from each of the planes PL1 to PL4.

According to an embodiment, the memory block group MBG may comprise a plurality of memory blocks MB having the same block address within respective individual planes PL1 to PL4.

The non-volatile memory device 120 may perform a single operation on a single plane at a time. In other words, the non-volatile memory device 120 may not simultaneously perform two or more operations on a single plane at the same time.

Therefore, assuming a second operation has a higher priority than a first operation on a particular plane, the non-volatile memory device 120 may suspend the first operation on that plane, which is in progress, and may preferentially perform the second operation on that plane while the first operation is suspended according to a control of the controller 110. Then, the non-volatile memory device 120 may resume the suspended first operation after completion of the second operation. The non-volatile memory device 120 may store, when suspending the first operation, process information of the first operation and may resume the suspended first operation based on the stored process information.

On the other hand, the suspending and resuming an operation on a memory block MB may cause charging and discharging of a voltage of the memory block MB, which may cause wear of the memory block MB. However, when all of operations currently being performed in parallel on the plurality of memory blocks MB configuring the memory block group MBG are suspended (i.e., in a case of a comprehensive suspension), all of the plurality of memory blocks MB configuring the memory block group MBG may evenly wear. However, when operations currently being performed in parallel on some of the memory blocks MB in the memory block group MBG are suspended and operations continue to be performed in parallel on the other or remaining memory blocks MB in the memory block group MBG (i.e., in a case of a partial suspension), all of the plurality of memory blocks MB configuring the memory block group MBG may unevenly wear. Uneven wear of memory blocks MB in the memory block group MBG may degrade the operation performance of the memory system 100.

For the controller 110 to manage degree of wear of the non-volatile memory device 120, the controller 110 may manage an erase count of each memory block group MBG. However, as described above, when a partial suspension is performed, that is, suspension is performed on some but not all of memory blocks MB in the memory block group MBG, the uneven wear of the plurality of memory blocks MB in the memory block group MBG may not be properly reflected in the erase count of the memory block group MBG.

In an embodiment, the controller 110 may include a suspension manager 111 in order to effectively alleviate uneven wear due to partial suspension in the non-volatile memory device 120, and even in order to improve a read performance of the memory system 100.

The suspension manager 111 may control the non-volatile memory device 120 to suspend an operation of a lower priority and preferentially perform an operation of a higher priority. The relative priority of each operation may be determined according to a priority policy, which may be set in advance. For example, a read operation according to a read request from a host device is considered a higher priority operation, as is an operation to which a higher priority is assigned by the host device. A write operation and an erase operation may each be considered a low priority operation. In accordance with an embodiment of the present invention, each of various other operations may be prioritized as a high (or higher) priority operation or a low (or lower) priority operation according the priority policy.

The suspension manager 111 may manage a suspension count of each of the plurality of memory blocks MB included in the non-volatile memory device 120. The suspension count of a memory block MB may represent the number of times an in-progress operation is suspended, i.e., the number of times a suspension operation is performed, on the corresponding memory block MB. The suspension count may be increased each time a suspension operation is performed on the corresponding memory block MB.

The suspension manager 111 may determine whether to perform comprehensive suspension or partial suspension by comparing the suspension counts of the plurality of memory blocks MB configuring the memory block group MBG while the non-volatile memory device 120 performs lower priority operations on the plurality of memory blocks MB configuring the memory block group MBG.

In an embodiment, the suspension manager 111 may manage an allowed high priority operation count per low priority operation suspension for each of the plurality of memory blocks MB in the non-volatile memory device 120. The allowed high priority operation count per low priority operation suspension for a memory block MB may be a maximum number of operations of a higher priority that are allowed to be performed on a plane including the memory block MB during the time in which a low priority operation on the memory block MB is suspended, i.e., from when the low priority operation is suspended to when it is resumed.

The suspension manager 111 may adjust the allowed high priority operation count per low priority operation suspension for a memory block MB, on which comprehensive suspension or partial suspension is to be performed, by comparing the suspension counts of the plurality of memory blocks MB configuring the memory block group MBG.

FIG. 2 is a diagram illustrating a method in which the suspension manager 111 of FIG. 1 performs a process of comprehensive suspension in accordance with an embodiment.

Referring to FIG. 2, in step S21, the non-volatile memory device 120 may be performing write operations in parallel on memory units MU1 to MU4 of respective memory blocks MB1 to MB4 configuring a memory block group MBG1.

In step S22, the controller 110 may receive a read request for the memory unit MU5 of the memory block MB5 from a host device. A read operation corresponding to the read request for the memory unit MU5 may have a higher priority than the write operations being performed on the memory units MU1 to MU4.

Hereinafter, a plane on which a higher priority operation is to be performed is defined as a target plane. Therefore, in the example of FIG. 2, plane PL1 on which the higher priority read operation is to be performed is a target plane.

A memory block on which a lower priority operation is being performed within a target plane is defined as a target memory block. The lower priority operation is subject to being suspended in order for a higher priority operation to be preferentially performed. Therefore, in the example of FIG. 2, the memory block MB1 on which the lower priority write operation is being performed within the target plane PL1 is a target memory block.

A memory block group including a target memory block is defined as a target memory block group. Therefore, in the example of FIG. 2, the memory block group MBG1 including the target memory block MB1 is a target memory block group.

In step S23, the suspension manager 111 may perform a comprehensive suspension process on all the memory blocks MB1 to MB4 within the target memory block group MBG1. According to the control of the suspension manager 111, the non-volatile memory device 120 may suspend write operations on the memory blocks MB1 to MB4.

For example, the suspension manager 111 may compare suspension counts of the memory blocks MB1 to MB4 in the target memory block group MBG1. The suspension manager 111 may determine, when the suspension count of each of the memory blocks MB1 to MB4 is greater than a threshold, to perform a comprehensive suspension process on the memory blocks MB1 to MB4.

In step S24, the controller 110 may control, in response to a read request received from a host device, the non-volatile memory device 120 to perform a read operation on the memory unit MU5. Since the write operation performed on the target plane PL1 is suspended, the non-volatile memory device 120 may perform the read operation on the target plane PL1.

In step S25, the suspension manager 111 may control, after completion of the read operation on the memory unit MU5, the non-volatile memory device 120 to resume the write operations on the memory blocks MB1 to MB4 in the target memory block group MBG1. According to the control of the suspension manager 111, the non-volatile memory device 120 may resume the suspended write operation on the memory blocks MB1 to MB4.

In short, when the suspension count of each of the memory blocks MB1 to MB4 in the target memory block group MBG1 is greater than the threshold, there may be a high possibility that one or more suspension operations are to be performed, in the near future, on other memory blocks MB2 to MB4, as well as on the target memory block MB1, in the target memory block group MBG1. Also, that the suspension count of each of the memory blocks MB1 to MB4 is greater than the threshold may mean a higher frequency of suspension operations on the memory blocks in the target memory block group MBG1. In other words, when the suspension count of each of the memory blocks MB1 to MB4 in the target memory block group MBG1 is greater than the threshold, there may be a high possibility that one or more read requests for read operations on other memory blocks MB2 to MB4 in the target memory block group MBG1 will be received from the host device in the near future.

Therefore, the suspension manager 111 may control the non-volatile memory device 120 to comprehensively suspend the write operations being performed on all the memory blocks MB1 to MB4 in the target memory block group MBG1 thereby removing possibility that read latency for the host device is degraded. By suspending the write operations on other memory blocks MB2 to MB4 in the target memory block group MBG1, the controller 110 may promptly process read requests received from the host.

Figure 3:
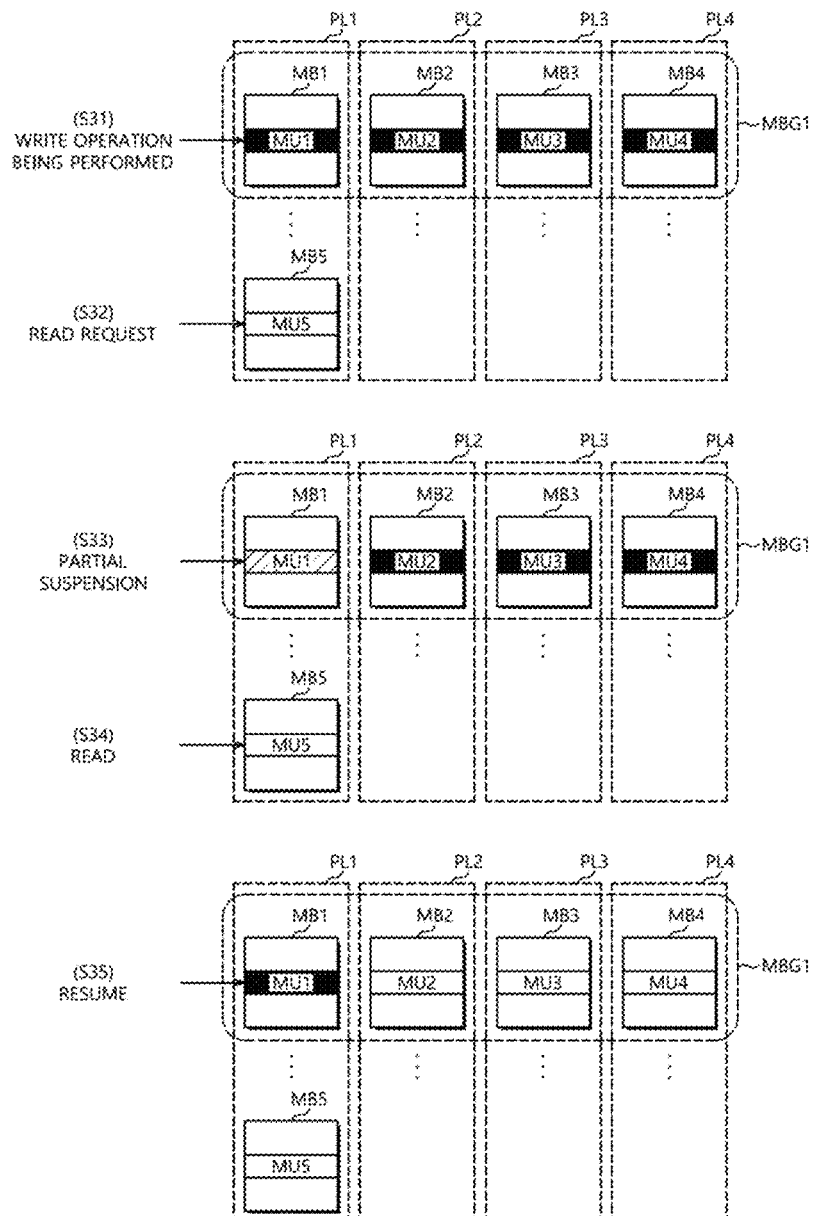
FIG. 3 is a diagram illustrating a method in which a suspension manager, such as that of FIG. 1, performs a process of partial suspension in accordance with an embodiment.

FIG. 3 is a diagram illustrating a method in which the suspension manager 111 of FIG. 1 performs a process of partial suspension in accordance with an embodiment.

Referring to FIG. 3, steps S31 and S32 may be the same as steps S21 and S22 of FIG. 2.

In step S33, the suspension manager 111 may perform a process of partial suspension, that is, suspension only on the target memory block MB1. According to the control of the suspension manager 111, the non-volatile memory device 120 may suspend the write operation on the target memory block MB1 and may keep performing the write operations on other memory blocks MB2 to MB4 in the target memory block group MBG1.

For example, the suspension manager 111 may compare suspension counts of the memory blocks MB1 to MB4 in the target memory block group MBG1. The suspension manager 111 may determine, when at least one of these suspension counts is not greater than the threshold, to perform a process of partial suspension on the target memory block MB1 in the target memory block group MBG1.

In step S34, the controller 110 may control, in response to a read request received from the host device, the non-volatile memory device 120 to perform a read operation on the memory unit MU5. Since the write operation performed on the target plane PL1 is suspended, the non-volatile memory device 120 may perform the read operation on the target plane PL1. The non-volatile memory device 120 may perform, in parallel, the read operation on the memory block MB5 and the write operations on the memory blocks MB2 to MB4 in the target memory block group MBG1.

In step S35, the suspension manager 111 may control, after completion of the read operation on the memory unit MU5, the non-volatile memory device 120 to resume the write operation that was suspended as a result of the partial suspension on the target memory block MB1 in the target memory block group MBG1. After the write operations are completed on other memory blocks MB2 to MB4 in the target memory block group MBG1, the non-volatile memory device 120 may resume performance of the write operation on the target memory block MB1.

To sum up, when there is a low possibility of receiving from the host device read requests for read operations on other memory blocks MB2 to MB4 in the target memory block group MBG1 in the near future, the suspension manager 111 may perform a partial suspension process only on the target memory block MB1 in the target memory block group MBG1, thereby promptly completing the write operations on other memory blocks MB2 to MB4 in the target memory block group MBG1.

Although FIGS. 2 and 3 illustrate the suspension of write operations, the suspension manager 111 may operate in a similar way as described above, even when other lower priority operations (e.g., erase operations) being performed on the memory blocks MB1 to MB4.

Although FIGS. 2 and 3 illustrate the operations (i.e., the write operations) being performed on all memory blocks MB1 to MB4 configuring a target memory block group MBG1, the suspension manager 111 may operate in a similar way as described above, even when lower priority operations are being performed on some memory blocks including the target memory block MB1 in the target memory block group MBG1 in accordance with an embodiment. That is, by considering the suspension counts of all the memory blocks MB1 to MB4 configuring the memory block group MBG1, the suspension manager 111 may perform a comprehensive suspension process on some memory blocks on which lower priority operations are being performed within the target memory block group MBG1 or may perform a partial suspension process on the target memory block MB1.

Figure 4:
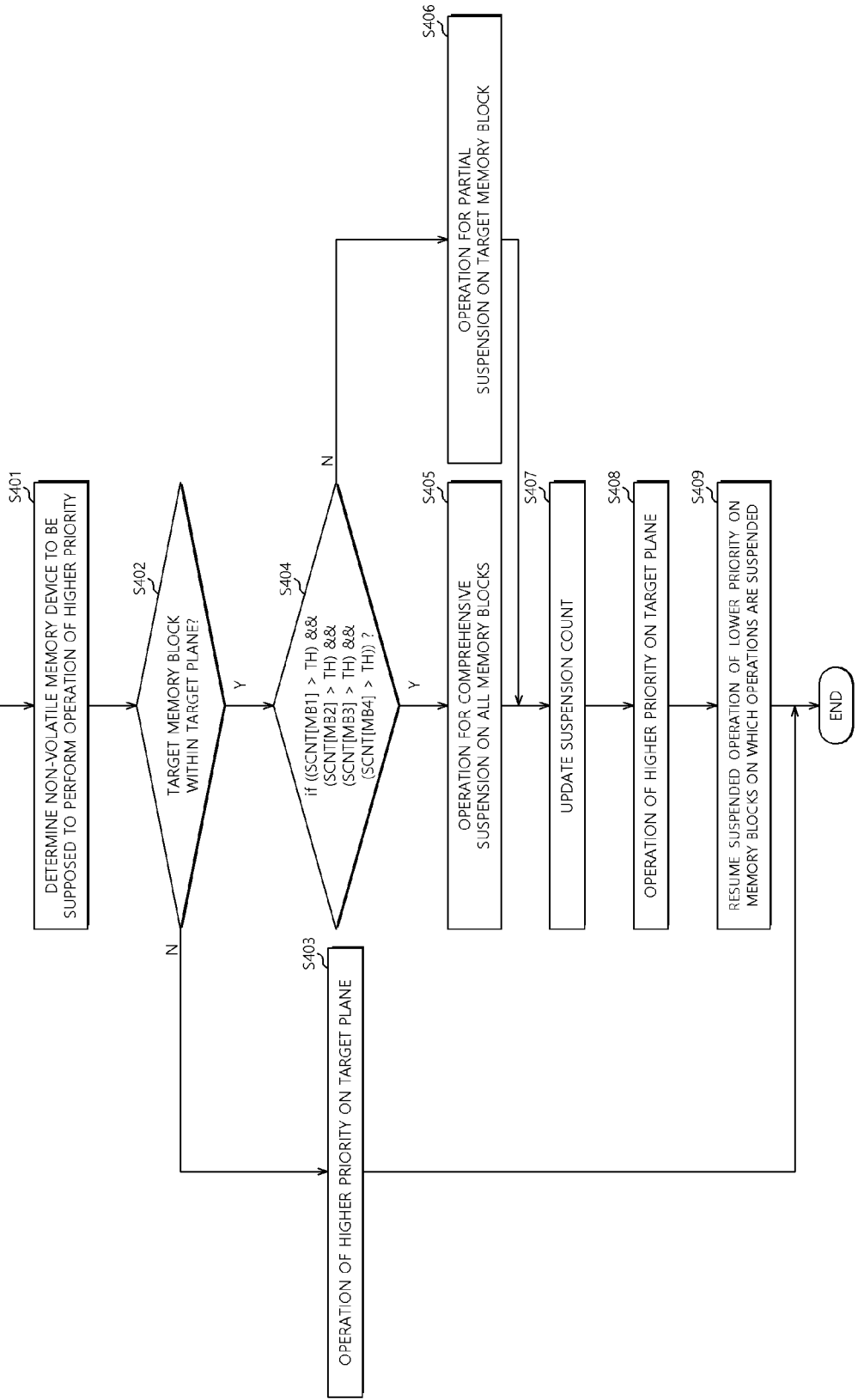
FIG. 4 is a flowchart illustrating an operating method of a controller, such as that of FIG. 1, in accordance with an embodiment.

FIG. 4 is a flowchart illustrating an operating method of the controller 110 of FIG. 1 in accordance with an embodiment.

Referring to FIG. 4, in step S401, the controller 110 may determine a target plane (e.g., target plane PL1 of FIG. 2) on which to perform a higher priority operation while performing lower priority operations on a target memory block group (e.g., memory block group MBG1 of FIG. 2). For example, the controller 110 may determine the target plane on which to perform a read operation, which is of a higher priority, when receiving a read request from the host device.

In step S402, the suspension manager 111 may determine whether a target memory block exists in the target plane PL1 of the non-volatile memory device 120. If a target memory block does not exist in the target plane PL1 (that is, "N" at S402), the process may go to step S403.

In step S403, the controller 110 may control the non-volatile memory device 120 to perform the higher priority operation on the target plane PL1. That is, since no operation is being performed on the target plane PL1, the non-volatile memory device 120 may perform the higher priority operation on the target plane PL1.

On the other hand, if a target memory block (e.g., the target memory block MB1 of FIG. 2) exists in the target plane PL1 (that is, "Y" at S402), the process may go to step S404.

In step S404, the suspension manager 111 may determine whether each of suspension counts SCNT[MB1], SCNT[MB2], SCNT[MB3] and SCNT[MB4] of the memory blocks MB1 to MB4, respectively, configuring the target memory block group MBG1 is greater than the threshold TH. When each of these suspension counts, i.e., SCNT[MB1], SCNT[MB2], SCNT[MB3] and SCNT[MB4] is greater than the threshold TH (that is, "Y" at S404), the process may go to step S405. When at least one of the suspension counts SCNT[MB1], SCNT[MB2], SCNT[MB3] and SCNT[MB4] is not greater than the threshold TH (that is, "N" at S404), the process may go to step S406.

In step S405, the suspension manager 111 may perform a comprehensive suspension process on all the memory blocks on which operations are being performed within the target memory block group MBG1. In other words, the suspension manager 111 may control the non-volatile memory device 120 to suspend all operations being performed within the target memory block group MBG1.

In step S406, the suspension manager 111 may perform a partial suspension process, i.e., suspension only on the target memory block MB1 in the target memory block group MBG1. In other words, the suspension manager 111 may control the non-volatile memory device 120 to suspend the operation being performed only on the target memory block MB1 and keep performing operations on other memory blocks MB2 to MB4 in the target memory block group MBG1.

In step S407, the suspension manager 111 may update the suspension counts of one or more memory blocks on which operations are suspended within the target memory block group MBG1. In the case of comprehensive suspension, the suspension manager 111 may increase all the suspension counts of a plurality of memory blocks on which the operations are suspended. In the case of partial suspension, the suspension manager 111 may increase only the suspension count SCNT[MB1] of the target memory block MB1.

In step S408, the controller 110 may control the non-volatile memory device 120 to perform the higher priority operation on the target plane PL1. Since the non-volatile memory device 120 suspends the lower priority operations on the target plane PL1, the non-volatile memory device 120 may perform the higher priority operation on the target plane PL1.

In step S409, the suspension manager 111 may control, after completion of the higher priority operation, the non-volatile memory device 120 to resume the suspended lower priority operations on memory blocks on which operations are suspended.

In accordance with an embodiment, the sequence of steps S401 to S409 is not limited to that illustrated in FIG. 4. For example, step S407 may be performed after or simultaneously with step S408.

Figure 5:
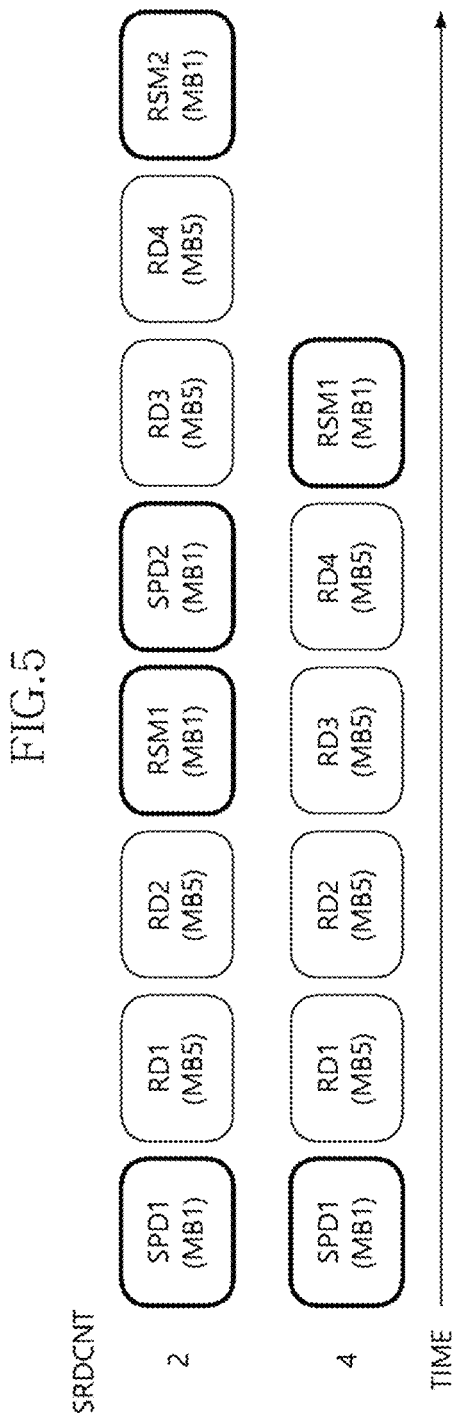
FIG. 5 is a diagram illustrating an allowed read count per suspension in accordance with an embodiment.

FIG. 5 is a diagram illustrating an allowed read count per suspension SRDCNT in accordance with an embodiment.

Referring to FIG. 5, the allowed read count per suspension SRDCNT for a memory block MB may be a maximum number of read operations of a higher priority that are allowed to be performed on a plane including the memory block MB during the time a lower priority operation on the memory block MB is suspended, i.e., from when the lower priority operation is suspended to when it is resumed. For example, a number of read operations may be a number of read commands provided from the controller 110 to the non-volatile memory device 120.

The higher priority read operations that are allowed to be performed on a plane including a memory block MB may not be limited to read operations on the single memory block MB. That is, read operations may be performed on other memory blocks included in the same plane as the memory block MB during the time a lower priority operation is suspended.

For example, when four read operations RD1 to RD4 of a higher priority are to be preferentially performed on a memory block (e.g., the memory block MB5 of FIG. 2) in the same plane PL1 as a memory block (e.g., the memory block MB1 of FIG. 2) on which a lower priority operation is being performed, the controller 110 may operate as follows.

When the allowed read count per suspension SRDCNT for the memory block MB1 is "2", the controller 110 may control the non-volatile memory device 120 to perform two read operations RD1 and RD2 on the memory block MB5 between a first suspension SPD1 and a first resumption RSM1 on the memory block MB1. Then, the controller 110 may immediately perform a second suspension SPD2 on the memory block MB1 and may control the non-volatile memory device 120 to perform two read operations RD3 and RD4 on the memory block MB5 between the second suspension SPD2 and a second resumption RSM2 on the memory block MB1.

When the allowed read count per suspension SRDCNT for the memory block MB1 is "4", the controller 110 may control the non-volatile memory device 120 to perform four read operations RD1 to RD4 on the memory block MB5 between a first suspension SPD1 and a first resumption RSM1 on the memory block MB1.

As described above, the allowed read count per suspension SRDCNT for the memory block MB1 may be a maximum number of read operations that are allowed to be performed on the plane PL1 including the memory block MB1 between the first suspension SPD1 and the first resumption RSM1 on the memory block MB1. In an embodiment, when there is no read operation to be performed after the first suspension SPD1 and the first read operation RD1, the first resumption RSM1 may occur. In another embodiment, when there is no read operation to be performed after the first suspension SPD1 and the first read operation RD1, the controller 110 may wait for an additional read operation for a set amount of time.

As described above, suspension on the memory block MB1 may cause the wear of the memory block MB1. When the allowed read count per suspension SRDCNT for a memory block MB1 is "2", the second suspension SPD2 and the second resumption RSM2 may impose further wear on the memory block MB1 compared to when the allowed read count per suspension SRDCNT for the memory block MB1 is "4". Therefore, the memory block MB1 may wear more when the allowed read count per a suspension SRDCNT for a memory block MB1 is "2" than when the allowed read count per suspension SRDCNT for the memory block MB1 is "4". Also, in view of read latency for the host device, it may take more time to perform four read operations RD1 to RD4 when the allowed read count per suspension SRDCNT for a memory block MB1 is "2" than when the allowed read count per suspension SRDCNT for the memory block MB1 is "4".

Therefore, the suspension manager 111 may increase the allowed read count per suspension SRDCNT for each of the memory blocks MB1 to MB4 configuring a target memory block group (e.g., the memory block group MBG1 of FIG. 2) when each of these suspension counts is greater than the threshold.

In other words, when the suspension count of each of the memory blocks MB1 to MB4 in the target memory block group MBG1 is greater than the threshold, there may be a high possibility of receiving read requests for the target memory block group MBG1 from the host device in the near future. Therefore, the suspension manager 111 may increase the allowed read count per suspension SRDCNT for each of the memory blocks MB1 to MB4 in the target memory block group MBG1 to eliminate the possibility that read latency for the host device is degraded.

Also, the suspension manager 111 may increase only the allowed read count per suspension SRDCNT of a target memory block (e.g., the memory block MB1 of FIG. 2) among the memory blocks MB1 to MB4 in the target memory block group MBG1 when at least one of the suspension counts of the memory blocks MB1 to MB4 in the target memory block group MBG1 is not greater than the threshold and the suspension count of the target memory block MB1 is somewhat greater than the suspension count of each of the other memory blocks MB2 to MB4. For example, the suspension manager 111 may determine the suspension count of the target memory block MB1 as somewhat greater than the suspension counts of the other memory blocks MB2 to MB4 when the suspension count of the target memory block MB1 is greater than an average of the suspension counts of the other memory blocks MB2 to MB4. For example, the suspension manager 111 may determine the suspension count of the target memory block MB1 as somewhat greater than the suspension counts of the other memory blocks MB2 to MB4 when the suspension count of the target memory block MB1 is greater than an average of the suspension counts, except the minimum suspension count, of the other memory blocks MB2 to MB4.

That the suspension count of the target memory block MB1 is somewhat greater than the suspension counts of the other memory blocks MB2 to MB4 in the target memory block group MBG1, means there is a high possibility that a read request for the target memory block MB1 will be received from the host device in the near future. Therefore, the suspension manager 111 may increase the allowed read count per suspension SRDCNT for the target memory block MB1 to eliminate the possibility that read latency for the host device is degraded. Also, that the suspension count of the target memory block MB1 is somewhat greater than the suspension counts of the other memory blocks MB2 to MB4 included in the target memory block group MBG1, means that the target memory block MB1 wears more intensely than other memory blocks MB2 to MB4 in the target memory block group MBG1. Therefore, the suspension manager 111 may increase only the allowed read count per suspension SRDCNT for the target memory block MB1 to suppress the wear of the target memory block MB1. Accordingly, the memory blocks MB1 to MB4 configuring the target memory block group MBG1 may wear more evenly.

Also, the suspension manager 111 may decrease the allowed read count per suspension SRDCNT of the target memory block MB1 among the memory blocks MB1 to MB4 configuring the target memory block group MBG1 when at least one of the suspension counts of the memory blocks MB1 to MB4 in the target memory block group MBG1 is not greater than the threshold and the suspension count of the target memory block MB1 is less than the suspension count of each of the other memory blocks MB2 to MB4.

The target memory block MB1 having the lowest suspension count among the memory blocks MB1 to MB4 configuring the target memory block group MBG1 may wear least among the memory blocks MB1 to MB4. Therefore, the suspension manager 111 may decrease the allowed read count per suspension SRDCNT for the target memory block MB1 to accelerate the wear of the target memory block MB1. Accordingly, the memory blocks MB1 to MB4 configuring the target memory block group MBG1 may wear more evenly.

Each increment and decrement of the allowed read count per suspension SRDCNT may be a value of "1" or other set value.

In an embodiment, the suspension manager 111 may manage the allowed operation count per suspension. The suspension manager 111 may operate based on the allowed operation count per suspension in a substantially similar way as described above with respect to the allowed read count per suspension SRDCNT. That is, the allowed operation count per suspension for a memory block MB may be a maximum number of higher priority operations that are allowed to be performed on a plane including the memory block MB during a time a lower priority operation on the memory block MB is suspended. For example, a number of operations may be a number of commands provided from the controller 110 to the non-volatile memory device 120.

The higher priority operations that are allowed to be performed on a plane including a memory block MB may not be limited to the operations on the single memory block MB. That is, the higher priority operations may be performed on other memory blocks in the same plane as the memory block MB during suspension of the lower priority operation.

In an embodiment, the higher priority operations that are allowed to be performed on a plane including a memory block MB may be different operations. For example, read and write operations of a higher priority may be performed on other memory blocks in the same plane as the memory block MB during suspension of the lower priority operation.

Figure 6:
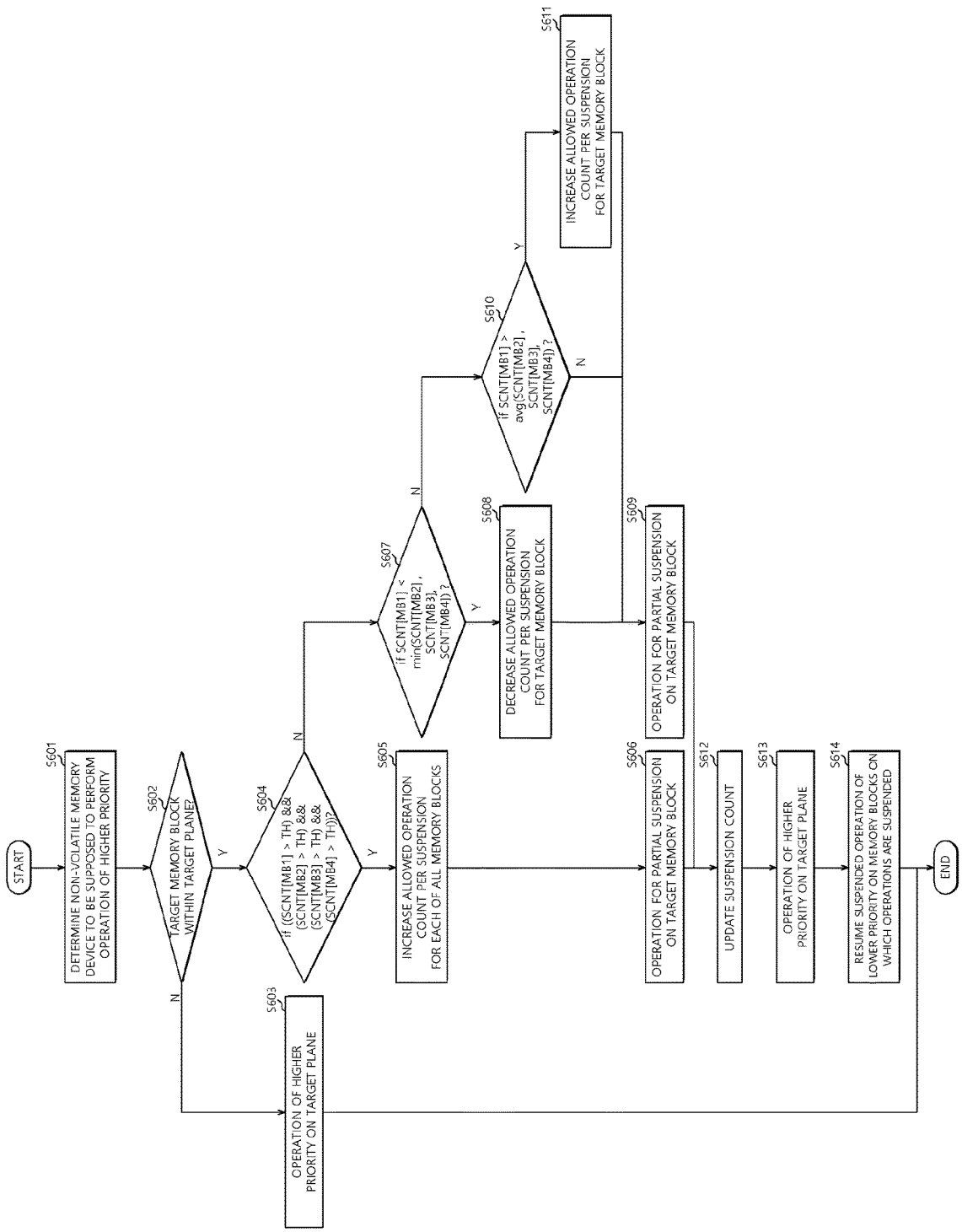
FIG. 6 is a flowchart illustrating an operating method of a controller, such as that of FIG. 1, in accordance with an embodiment.

FIG. 6 is a flowchart illustrating an operating method of the controller 111 of FIG. 1 in accordance with an embodiment.

Referring to FIG. 6, steps S601 to S604 may be substantially the same as steps S401 to S404 of FIG. 4.

In step S605, the suspension manager 111 may increase the allowed operation count per suspension for each of all the memory blocks MB1 to MB4 configuring a target memory block group (e.g. the memory block group MBG1 of FIG. 2).

In step S606, the suspension manager 111 may perform a comprehensive suspension process on all the memory blocks on which operations are being performed within the target memory block group MBG1. In other words, the suspension manager 111 may control the non-volatile memory device 120 to suspend all operations being performed within the target memory block group MBG1.

On the other hand, when at least one of the suspension counts SCNT[MB1], SCNT[MB2], SCNT[MB3] and SCNT[MB4] of the memory blocks MB1 to MB4, respectively, configuring the target memory block group MBG1 is not greater than the threshold TH (that is, "N" in step S604, the process may go to step S607. In step S607, the suspension manager 111 may determine whether the suspension count SCNT[MB1] of the target memory block MB1 is less than each of the suspension counts SCNT[MB2], SCNT[MB3] and SCNT[MB4]. When the suspension count SCNT[MB1] is less than each of the suspension counts SCNT[MB2], SCNT[MB3] and SCNT[MB4] (that is, "Y" at S607), the process may go to step S608. When the suspension count SCNT[MB1] is not less than at least one of SCNT[MB2], SCNT[MB3] and SCNT[MB4] (that is, "N" at S607), the process may go to step S610.

In step S608, the suspension manager 111 may decrease the allowed operation count per suspension for the target memory block MB1.

In step S609, the suspension manager 111 may perform a partial suspension process, i.e., suspension only on the target memory block MB1 in the target memory block group MBG1. In other words, the suspension manager 111 may control the non-volatile memory device 120 to suspend the operation being performed only on the target memory block MB1 and to keep performing operations on other memory blocks MB2 to MB4 in the target memory block group MBG1.

In step S610, the suspension manager 111 may determine whether the suspension count SCNT[MB1] of the target memory block MB1 is greater than the average of the suspension counts SCNT[MB2], SCNT[MB3] and SCNT [MB4] of other memory blocks MB2 to MB4, respectively, in the target memory block group MBG1. When the suspension count SCNT[MB1] of the target memory block MB1 is greater than the average of the suspension counts SCNT[MB2], SCNT[MB3] and SCNT[MB4] (that is, "Y" at S610), the process may go to step S611.

In step S611, the suspension manager 111 may increase the allowed operation count per suspension for the target memory block MB1.

On the other hand, when the suspension count SCNT [MB1] of the target memory block MB1 is not greater than the average of the suspension counts SCNT[MB2], SCNT [MB3] and SCNT[MB4] (that is, "N" in step S610, the process may go to step S609. That is, the allowed operation count per suspension for the target memory block MB1 may not change in this case.

In step S612, the suspension manager 111 may update the suspension counts of one or more memory blocks on which operations are suspended within the target memory block group MBG1. In the case of comprehensive suspension, the suspension manager 111 may increase all the suspension counts of a plurality of memory blocks on which the operations are suspended. In the case of partial suspension, the suspension manager 111 may increase only the suspension count SCNT[MB1] of the target memory block MB1.

In step S613, the controller 110 may control the non-volatile memory device 120 to perform the higher priority operation on the target plane PL1. Since the non-volatile memory device 120 suspends performance of the lower priority operations on the target plane PL1, the non-volatile memory device 120 may perform the higher priority operation on the target plane PL1.

In step S614, the suspension manager 111 may control, after completion of the higher priority operation, the non-volatile memory device 120 to resume the suspended lower priority operations on memory blocks on which operations are suspended.

Figures 7, 8:
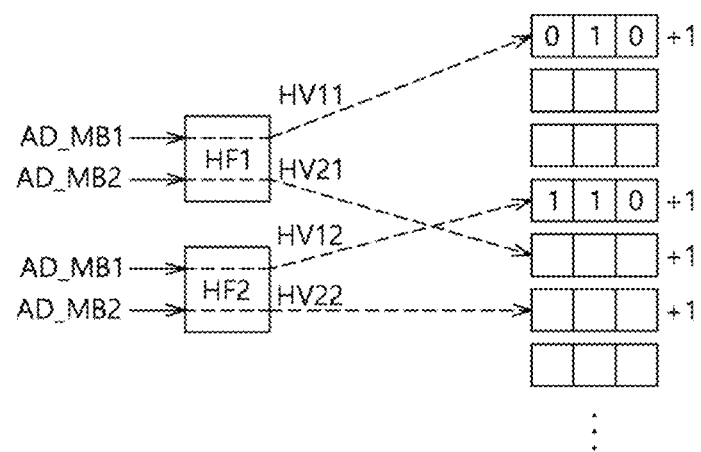
FIG. 7 is a diagram illustrating a table including a suspension count and an allowed operation count per suspension in accordance with an embodiment.
FIG. 8 is a diagram illustrating a method in which a suspension manager manages a suspension count in accordance with an embodiment.

FIG. 7 is a diagram illustrating a table 701 including a suspension count SCNT and an allowed operation count per suspension SOPCNT in accordance with an embodiment.

Referring to FIG. 7, the table 701 may include the suspension count SCNT and the allowed operation count per suspension SOPCNT for each of the memory blocks MB in the non-volatile memory device 120.

The suspension manager 111 may store the table 701 in a memory (not illustrated) in the non-volatile memory device 120 and/or the controller 110 and manage the table 701.

FIG. 8 is a diagram illustrating a method in which the suspension manager 111 manages the suspension count SCNT in accordance with an embodiment.

Referring to FIG. 8, unlike in the embodiment of FIG. 7, the suspension manager 111 may not manage the suspension count SCNT of each of the memory blocks MB, but may manage the suspension count SCNT with a small amount of memory space by using hash functions HF1 and HF2.

For example, when the suspension manager 111 updates the suspension count SCNT of the memory block MB1, the hash functions HF1 and HF2 may commonly receive an address AD_MB1 of the memory block MB1 and may respectively output different hash values HV11 and HV12. The suspension manager 111 may increase a count stored in each of memory regions indicated by the hash values HV11 and HV12.

In a similar way, when the suspension manager 111 updates the suspension count SCNT of the memory block MB2, the hash functions HF1 and HF2 may commonly receive an address AD_MB2 of the memory block MB2 and may respectively output different hash values HV21 and HV22. The suspension manager 111 may increase a count stored in each of memory regions indicated by the hash values HV21 and HV22.

Although FIG. 8 illustrates each hash value indicating a 3-bit memory region as an example, the present invention is not limited in this respect; any suitably sized memory region may be indicated by a hash value. Although FIG. 8 illustrates two hash functions HF1 and HF2, more than two hash functions may be used.

After the update of the suspension count SCNT, the suspension manager 111 may refer to, as the suspension count SCNT of each memory block, a result of bitwise AND operation on the counts corresponding to the corresponding memory block. For example, the suspension count SCNT of the memory block MB1 may be a value of "011", which is a result of the bitwise AND operation on the counts 011" and "111".

In an embodiment, the suspension manager 111 may periodically right-shift the counts of FIG. 8. That is, the suspension manager 111 may remove a currently meaningless count of a memory block, on which a process for a suspension was performed a long time ago and has not performed recently, thereby reflecting most recent information in the count.

Figure 9:
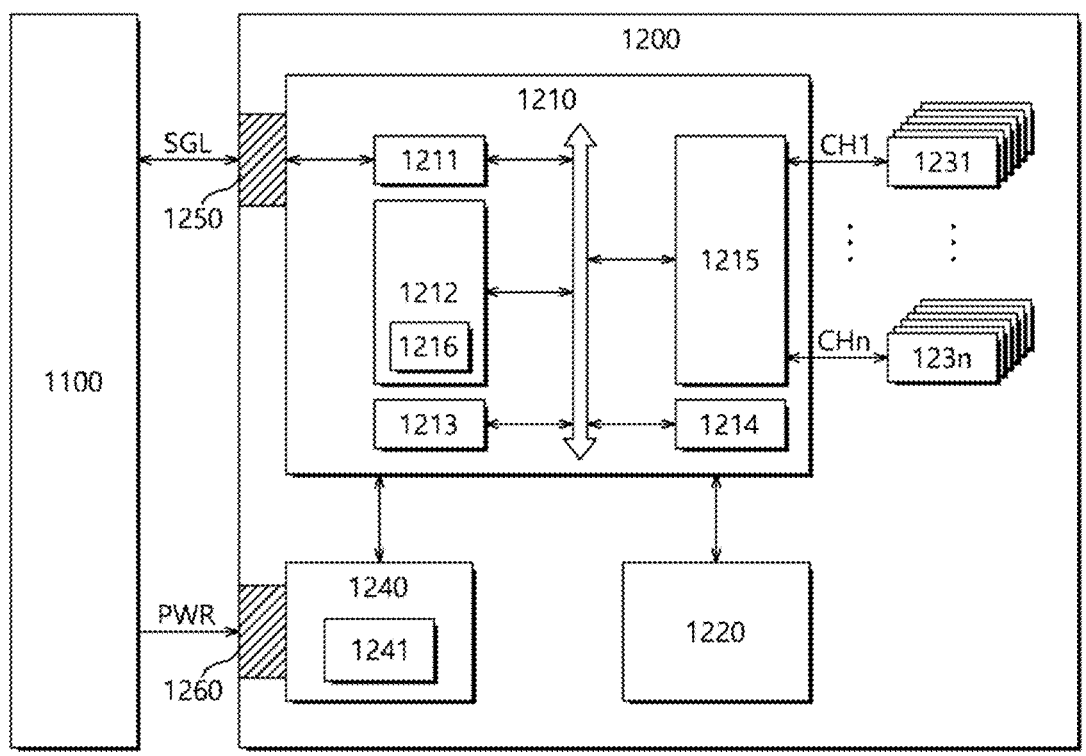
FIG. 9 is a diagram illustrating a data processing system including a solid state drive (SSD) in accordance with an embodiment.

FIG. 9 is a diagram illustrating a data processing system 1000 including a solid state drive (SSD) 1200 in accordance with an embodiment. Referring to FIG. 9, the data processing system 1000 may include a host device 1100 and the SSD 1200.

The SSD 1200 may include a controller 1210, a buffer memory device 1220, a plurality of nonvolatile memory devices 1231 to 123n, a power supply 1240, a signal connector 1250, and a power connector 1260.

The controller 1210 may control general operations of the SSD 1200. The controller 1210 may include a host interface 1211, a control component 1212, a random access memory 1213, an error correction code (ECC) component 1214, and a memory interface 1215.

The host interface 1211 may exchange a signal SGL with the host device 1100 through the signal connector 1250. The signal SGL may include a command, an address, data, and the like. The host interface 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-E) and/or universal flash storage (UFS).

The control component 1212 may analyze and process the signal SGL received from the host device 1100. The control component 1212 may control operations of internal function blocks according to firmware or software for driving the SSD 1200. The random access memory 1213 may be used as a working memory for driving such firmware or software.

The control component 1212 may include a suspension manager 1216. The suspension manager 1216 may be configured in the same manner as the suspension manager 111 shown in FIG. 1.

The ECC component 1214 may generate the parity data of data to be transmitted to at least one of the nonvolatile memory devices 1231 to 123n. The generated parity data may be stored together with the data in the nonvolatile memory devices 1231 to 123n. The ECC component 1214 may detect an error of the data read from at least one of the nonvolatile memory devices 1231 to 123n, based on the parity data. If a detected error is within a correctable range, the ECC component 1214 may correct the detected error.

The memory interface 1215 may provide control signals such as commands and addresses to at least one of the nonvolatile memory devices 1231 to 123n, according to control of the control component 1212. Moreover, the memory interface 1215 may exchange data with at least one of the nonvolatile memory devices 1231 to 123n, according to control of the control component 1212. For example, the memory interface 1215 may provide the data stored in the buffer memory device 1220, to at least one of the nonvolatile memory devices 1231 to 123n, or provide the data read from at least one of the nonvolatile memory devices 1231 to 123n to the buffer memory device 1220.

The buffer memory device 1220 may temporarily store data to be stored in at least one of the nonvolatile memory devices 1231 to 123n. Further, the buffer memory device 1220 may temporarily store the data read from at least one of the nonvolatile memory devices 1231 to 123n. The data temporarily stored in the buffer memory device 1220 may be transmitted to the host device 1100 or at least one of the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to the same channel. The nonvolatile memory devices coupled to the same channel may be coupled to the same signal bus and data bus.

The power supply 1240 may provide power PWR inputted through the power connector 1260 to the inside of the SSD 1200. The power supply 1240 may include an auxiliary power supply 1241. The auxiliary power supply 1241 may supply power to allow the SSD 1200 to be properly terminated when a sudden power-off occurs. The auxiliary power supply 1241 may include large capacity capacitors.

The signal connector 1250 may be configured by any of various types of connectors depending on an interface scheme between the host device 1100 and the SSD 1200.

The power connector 1260 may be configured by any of various types of connectors depending on a power supply scheme of the host device 1100.

Figure 10:
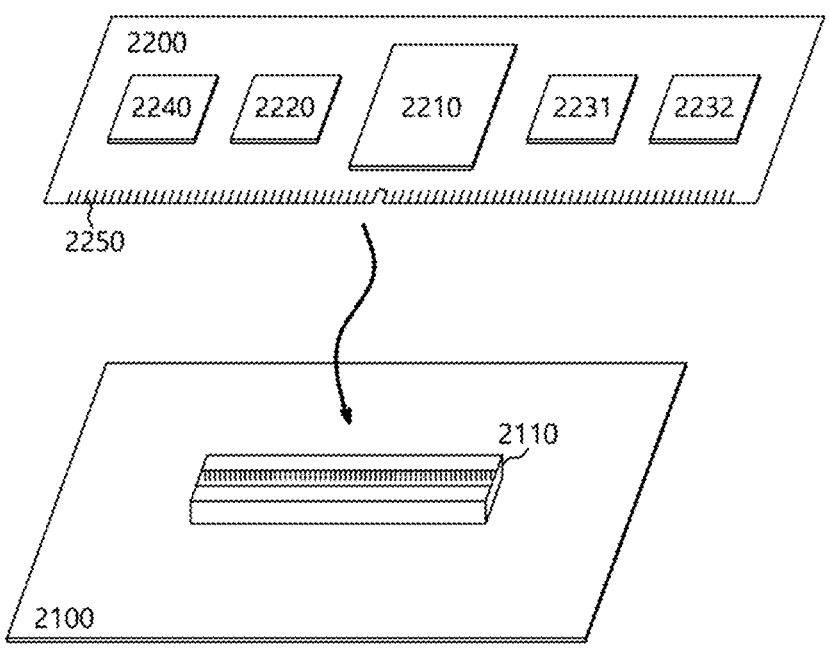
FIG. 10 is a diagram illustrating a data processing system including a memory system in accordance with an embodiment.

FIG. 10 is a diagram illustrating a data processing system 2000 including a memory system 2200 in accordance with an embodiment. Referring to FIG. 10, the data processing system 2000 may include a host device 2100 and the memory system 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The memory system 2200 may be mounted to the connection terminal 2110.

The memory system 2200 may be configured in the form of a board such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control general operations of the memory system 2200. The controller 2210 may be configured in the same manner as the controller 1210 shown in FIG. 9.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250 to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and the like, as well as power, may be transferred between the host device 2100 and the memory system 2200. The connection terminal 2250 may be configured as any of various types depending on an interface scheme between the host device 2100 and the memory system 2200. The connection terminal 2250 may be disposed on any one side of the memory system 2200.

Figure 11:
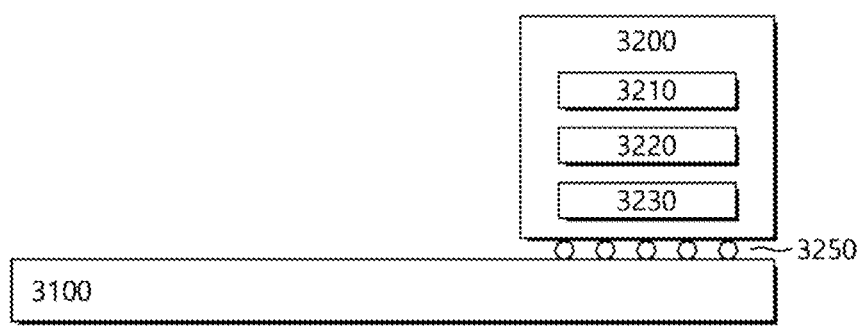
FIG. 11 is a diagram illustrating a data processing system including a memory system in accordance with an embodiment.

FIG. 11 is a diagram illustrating a data processing system 3000 including a memory system 3200 in accordance with an embodiment. Referring to FIG. 11, the data processing system 3000 may include a host device 3100 and the memory system 3200.

The host device 3100 may be configured in the form of a board such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control general operations of the memory system 3200. The controller 3210 may be configured in the same manner as the controller 1210 shown in FIG. 9.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 12:
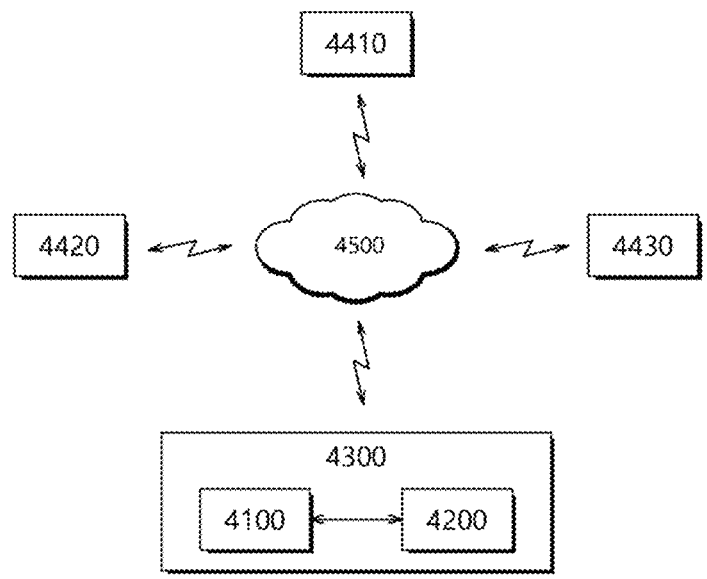
FIG. 12 is a diagram illustrating a network system including a memory system in accordance with an embodiment.

FIG. 12 is a diagram illustrating a network system 4000 including a memory system 4200 in accordance with an embodiment. Referring to FIG. 12, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be configured by the memory system 100 shown in FIG. 1, the memory system 1200 shown in FIG. 9, the memory system 2200 shown in FIG. 10 or the memory system 3200 shown in FIG. 11.

Figure 13:
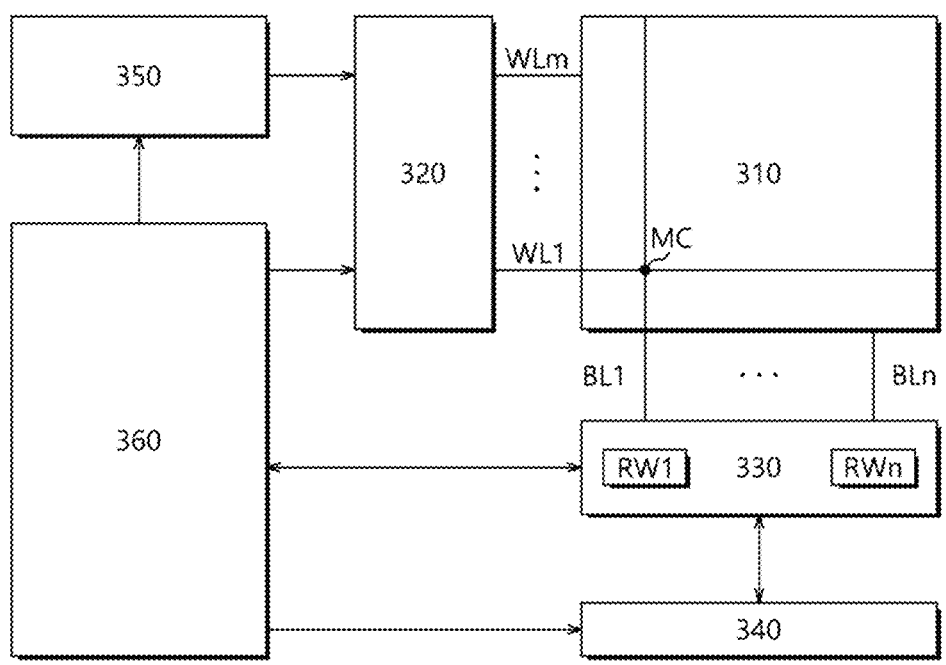
FIG. 13 is a block diagram illustrating a nonvolatile memory device included in a memory system in accordance with an embodiment.

FIG. 13 is a block diagram illustrating a nonvolatile memory device 300 included in a memory system in accordance with an embodiment. Referring to FIG. 13, the nonvolatile memory device 300 may include a memory cell array 310, a row decoder 320, a data read/write block 330, a column decoder 340, a voltage generator 350, and control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350 to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

While certain embodiments have been illustrated and described, it will be understood by those skilled in the art that the embodiments described are by way of example only. Accordingly, the present invention is not be limited to or by any of the described embodiments. Rather, the present invention encompasses all modifications and variations that fall within the scope of the claims.

What is claimed is:

1. A memory system comprising:
a non-volatile memory device configured to perform operations in parallel on a plurality of memory blocks; and
a controller configured to:
determine, in response to a read request on a plane including a target memory block among the plurality of memory blocks while performing the operations, whether to perform a partial suspension process on the operations based on suspension counts respectively corresponding to the plurality of memory blocks, and
control, when performing the partial suspension process, the non-volatile memory device to suspend an operation being performed on the target memory block, not to suspend other operations being performed on other memory blocks excluding the target memory block among the plurality of memory blocks, and to perform in parallel the other operations and a read operation on the plane based on the read request,
wherein the controller increases an allowed operation count per suspension for the target memory block by comparing a suspension count of the target memory block and an average of suspension counts of the other memory blocks.

2. The memory system of claim 1, wherein the controller determines to perform the partial suspension process when at least one of the suspension counts of the plurality of memory blocks is not greater than a threshold.

3. The memory system of claim 2, wherein the controller decreases the allowed operation count per suspension for the target memory block when the at least one of the suspension counts of the plurality of memory blocks is not greater than the threshold and the suspension count of the target memory block is less than each of the suspension counts of the other memory blocks.

4. The memory system of claim 2, wherein the controller increases the allowed operation count per suspension for the target memory block when the at least one of the suspension counts of the plurality of memory blocks is not greater than the threshold and the suspension count of the target memory block is greater than the average of the suspension counts of the other memory blocks.

5. The memory system of claim 1, wherein the controller updates, when performing the partial suspension process, only the suspension count of the target memory block among the suspension counts of the plurality of memory blocks.

6. The memory system of claim 1, wherein the controller determines to perform a comprehensive suspension process on the operations when each of the suspension counts is greater than a threshold, and
wherein the controller controls, when performing the comprehensive suspension process, the non-volatile memory device to suspend all the operations being performed on the plurality of memory blocks.

7. The memory system of claim 6, wherein the controller increases an allowed operation count per suspension for each of the plurality of memory blocks when each of the suspension counts of the plurality of memory blocks is greater than the threshold.

8. The memory system of claim 6, wherein the controller updates each of the suspension counts of the plurality of memory blocks when performing the comprehensive suspension process.

9. A memory system comprising:
a non-volatile memory device configured to perform operations in parallel on a plurality of memory blocks; and
a controller configured to perform a comprehensive suspension process or a partial suspension process on the operations based on suspension counts respectively corresponding to the plurality of memory blocks,
wherein, when the partial suspension process is performed, the non-volatile memory device suspends an operation being performed on a target memory block among the plurality of memory blocks and does not suspend other operations being performed on other memory blocks excluding the target memory block among the plurality of memory blocks,
wherein the controller increases an allowed operation count per suspension for the target memory block by comparing a suspension count of the target memory block and an average of suspension counts of the other memory blocks.

10. The memory system of claim 9,
wherein the controller performs the comprehensive suspension process on the operations when each of the suspension counts of the plurality of memory blocks is greater than a threshold, and
wherein the non-volatile memory device suspends all the operations being performed on the plurality of memory blocks according to a control of the controller.

11. The memory system of claim 10, wherein the controller increases, when performing the comprehensive suspension process, an allowed operation count per suspension for each of the plurality of memory blocks.

12. The memory system of claim 10, wherein the controller updates each of the suspension counts of the plurality of memory blocks when performing the comprehensive suspension process.

13. The memory system of claim 9, wherein the controller performs the partial suspension process when at least one of the suspension counts is not greater than a threshold.

14. The memory system of claim 13, wherein the controller decreases the allowed operation count per suspension for the target memory block when the at least one of the suspension counts of the plurality of memory blocks is not greater than the threshold and the suspension count of the target memory block is less than each of the suspension counts of the other memory blocks.

15. The memory system of claim 13, wherein the controller increases the allowed operation count per suspension for the target memory block when the at least one of the suspension counts of the plurality of memory blocks is not greater than the threshold and the suspension count of the target memory block is greater than the average of the suspension counts of the other memory blocks.

16. A memory system comprising:
a non-volatile memory device configured to perform first operations in parallel on a plurality of memory blocks included in a plurality of planes; and
a controller configured to:
control the non-volatile memory device to suspend the first operation being performed on a target memory block among the plurality of memory blocks, and
perform a second operation on a plane including the target memory block based on an allowed operation count per suspension for the target memory block,
wherein the allowed operation count per suspension is a maximum number of second operations that are allowed to be performed on the plane after the first operation is suspended and before the suspended first operation is resumed, and
wherein the controller increases the allowed operation count per suspension for the target memory block by comparing a suspension count of the target memory block and an average of suspension counts of other memory blocks.

17. The memory system of claim 16, wherein the controller increases an allowed operation count per suspension for each of the plurality of memory blocks when each of suspension counts of the plurality of memory blocks is greater than a threshold.

18. The memory system of claim 17, wherein the controller controls the non-volatile memory device to suspend all of the first operations being performed on the plurality of memory blocks when each of the suspension counts of the plurality of memory blocks is greater than the threshold.

19. The memory system of claim 17, wherein the controller controls the non-volatile memory device to suspend the first operation being performed on the target memory block and to keep performing the first operations on the other memory blocks among the plurality of memory blocks when at least one of the suspension counts of the plurality of memory blocks is not greater than the threshold.

* * * * *